United States Patent
Srinivasan

(10) Patent No.: US 11,876,778 B2
(45) Date of Patent: Jan. 16, 2024

(54) METHODS AND SYSTEMS OF A SECURE AND PRIVATE CUSTOMER SERVICE AUTOMATION PLATFORM

(71) Applicant: Raja Srinivasan, San Jose, CA (US)

(72) Inventor: Raja Srinivasan, San Jose, CA (US)

( * ) Notice: Subject to any disclaimer, the term of this patent is extended or adjusted under 35 U.S.C. 154(b) by 78 days.

(21) Appl. No.: 17/222,983

(22) Filed: Apr. 5, 2021

(65) Prior Publication Data

US 2022/0014498 A1   Jan. 13, 2022

Related U.S. Application Data

(60) Provisional application No. 63/005,436, filed on Apr. 5, 2020.

(51) Int. Cl.
| | | |
|---|---|---|
| H04L 29/06 | (2006.01) | |
| H04L 9/40 | (2022.01) | |
| G06F 16/903 | (2019.01) | |
| H04L 9/32 | (2006.01) | |

(52) U.S. Cl.
CPC .... *H04L 63/0209* (2013.01); *G06F 16/90335* (2019.01); *H04L 9/3213* (2013.01); *H04L 9/3247* (2013.01); *H04L 63/0815* (2013.01)

(58) Field of Classification Search
CPC . H04L 63/0209; H04L 9/3213; H04L 9/3247; H04L 63/0815; H04L 9/0861; H04L 63/0807; G06F 16/90335; G06F 16/972
See application file for complete search history.

(56) References Cited

U.S. PATENT DOCUMENTS

| | | | | |
|---|---|---|---|---|
| 7,587,499 B1* | 9/2009 | Haghpassand | ...... | H04L 63/0281 709/227 |
| 7,954,144 B1* | 5/2011 | Ebrahimi | ................ | H04L 67/02 709/227 |
| 2002/0091757 A1* | 7/2002 | Cuomo | ................... | H04L 63/08 713/155 |
| 2007/0124445 A1* | 5/2007 | Harris | ................... | G06F 16/957 709/223 |
| 2010/0306547 A1* | 12/2010 | Fallows | .............. | H04L 63/0815 713/178 |
| 2014/0019358 A1* | 1/2014 | Priebatsch | ......... | G06Q 20/3274 705/44 |
| 2014/0188756 A1* | 7/2014 | Ponnavaikko | ......... | G06Q 10/10 705/342 |
| 2014/0337974 A1* | 11/2014 | Joshi | ................... | H04L 63/1425 726/23 |
| 2016/0350817 A1* | 12/2016 | Garbarino | .......... | G06Q 30/0279 |

(Continued)

FOREIGN PATENT DOCUMENTS

| | | | | |
|---|---|---|---|---|
| CN | 104081742 A | * | 10/2014 | .......... G06F 21/141 |
| CN | 110493352 A | * | 11/2019 | |

(Continued)

*Primary Examiner* — Sher A Khan

(57) ABSTRACT

A computerized method for implementing a secure and private customer service automation platform. No customer data (like Name, Email, TaxID, Phone, other sensitive attributes) is stored on the customer support system (CSS). It is determined that a user queries for information. A client browser sends the request to API gateway. An application programming interface (API) gateway sends a request to an appropriate backend system after an authentication process; with the backend system.

4 Claims, 16 Drawing Sheets

(56) References Cited

U.S. PATENT DOCUMENTS

| | | | | |
|---|---|---|---|---|
| 2018/0034796 A1* | 2/2018 | Ross | ............... | H04L 63/08 |
| 2019/0246160 A1* | 8/2019 | Williams | ............... | H04L 9/006 |
| 2020/0153818 A1* | 5/2020 | Chauhan | ............... | H04L 63/0853 |
| 2021/0133274 A1* | 5/2021 | Chu | ............... | G06F 16/9577 |

FOREIGN PATENT DOCUMENTS

| | | | | | |
|---|---|---|---|---|---|
| CN | 111357001 | A | * | 6/2020 | ............ G06F 16/245 |
| EP | 3148165 | B1 | * | 8/2019 | ............ G06F 16/9566 |
| WO | WO-02077819 | A1 | * | 10/2002 | ............ H04L 29/08621 |
| WO | WO-2005006703 | A2 | * | 1/2005 | ............ H04L 63/0823 |
| WO | WO-2008111048 | A2 | * | 9/2008 | ............ G06F 9/4448 |

\* cited by examiner

METHODS AND SYSTEMS OF A SECURE AND PRIVATE CUSTOMER SERVICE AUTOMATION PLATFORM

CLAIM OF PRIORITY

This application claims priority to U.S. Provisional Application No. 63/005,436, titled METHODS AND SYSTEMS OF A SECURE AND PRIVATE CUSTOMER SERVICE AUTOMATION PLATFORM and filed on 5 Apr. 2020. This application is hereby incorporated by reference in its entirety.

BACKGROUND

As cloud adoption spreads, organizations have to choose between migrating their enterprise applications to the public cloud or staying on-premise in their own private cloud. While the former gives capital efficiency and quick time to market, it compromises on data privacy and security where organizations have to trust their cloud provider to keep their data safe and makes it much more difficult to integrate with internal systems. Any cost/time saved by moving to the public cloud is lost as it complicates data integration and data security/privacy. The latter option is better from a data privacy/security/integration option, but suffers from being expensive to implement and manage and is slow from a time to market perspective. There are hybrid cloud solutions but they are more from an infrastructure perspective and is not granular enough to maximize the use of public clouds. The solution proposed here provides the best of both worlds (Public and private cloud) with zero compromise on data privacy/security/control while letting organizations get the maximum value out of public cloud. These aspects are especially important in regulated industries like Banking, healthcare, government applications etc.

BRIEF SUMMARY OF THE INVENTION

A computerized method for implementing a secure and private customer service automation platform wherein no customer data (like Name, Email, TaxID, Phone, other sensitive attributes) is stored on the customer support system (CSS). This includes steps to describe the attributes/elements of the customer data, from where this should be fetched from and with what security mechanisms to ensure that only verified requests are allowed to fetch this information, what additional transformations (operations) should be performed on the fetched data, and how this data should be represented in a user interface all via configuration. This configuration data will henceforth be referred to as metadata while the actual data itself will be called virtual entity data. A client device (desktop browser/mobile application) sends a request to a customer-controlled application programming interface (API) gateway to fetch virtual entity data the API gateway in turn will use the pre-defined configuration metadata to ensure the request is from a trusted source (by confirming its access credentials) and then forwards the request to the appropriate customer-controlled internal system to fetch this virtual entity data from (based on configuration metadata). The customer-controlled internal system will validate the request and respond back with the virtual entity data requested. The customer-controlled API Gateway will perform the needed data transformations (Eg: mapping and applying formulas like Full Name=First Name+Last Name etc) as defined in the configuration metadata. The transformed virtual entity data is sent back directly to the client device which will use the configuration data to format and display the requested data.

Figure 1:
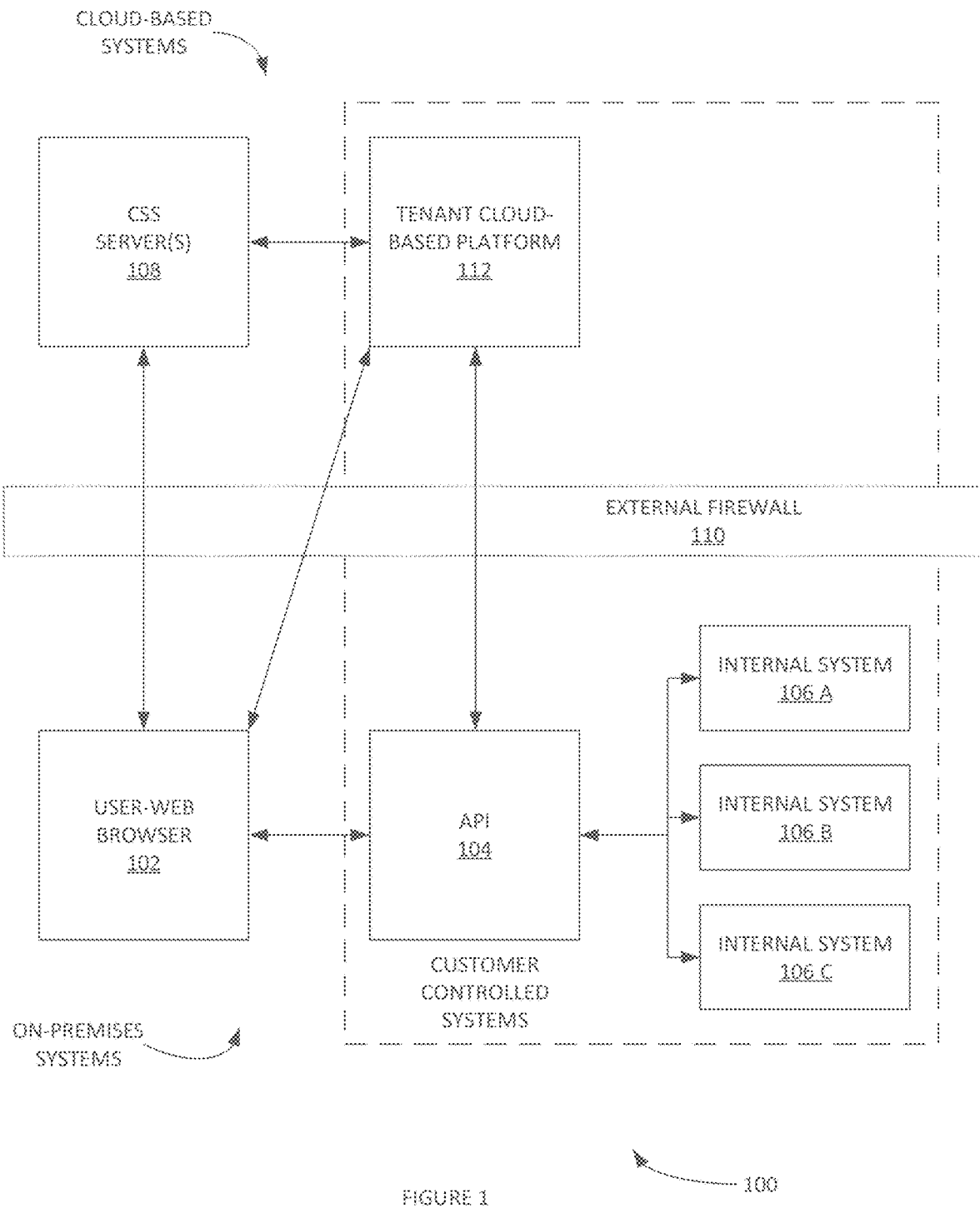
FIG. 1 illustrates an example secure and private customer service/customer support solutions (CSS) system for, according to some embodiments.

The Figures described above are a representative set and are not an exhaustive with respect to embodying the invention.

DESCRIPTION

Disclosed are a system, method, and article of secure and private customer service automation platform. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment, according to some embodiments. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) was originally understood to be an application specific computing interface to allow third parties to extend the functionality of that software application.

Cloud computing can be the on-demand availability of computer system resources, especially data storage and computing power, without direct active management by the user.

CSS Customer Support System (CSS) is the primary system that will provide all the required functions needed for an organization to support and serve its customers. Specifically in this context, it would refer to the systems run by the CSS cloud provider that is designed to serve multiple tenants/organizations.

Customer relationship management (CRM) is an approach to manage a company's interaction with current and potential customers. CRM uses data analysis about customers' history with a company to improve business relationships with customers, specifically focusing on customer retention Firewall can be a network security system that monitors and controls incoming and outgoing network traffic based on predetermined security rules. A firewall typically establishes a barrier between a trusted internal network and untrusted external network.

Web browser can be a software application for accessing information on the World Wide Web.

Example Methods and Systems

FIG. 1 illustrates an example secure and private customer service customer support solutions (CSS) system 100 for, according to some embodiments. CSS system 100 can be a customer service automation platform. CSS system 100 can be purpose-built to easily adapt to industry-specific use-cases/micro-verticals. CSS system 100 can incorporates various first-to-market innovations to address cloud-adoption concerns in regulated industries. CSS system 100 can integrate into existing core systems with minimal disruption. CSS system 100 can consolidates multiple point solutions for seamless integration and optimized workflows. CSS system 100 include a security-first design to meet needs around audit, compliance and security.

In one example, CSS system 100 can be provided as a fintech-oriented system. In this example, CSS system 100 can be provided as an integrated package. CSS system 100 can be a customer service automation platform specifically for financial industry (e.g. banks, fintech enterprises, etc.).

CSS system 100 does not store the bank's customer data. This is accomplished using a hybrid cloud design (e.g. see infra). As shown in FIG. 1, CSS system 100 is designed using various cloud-based/AI functionalities and platforms. Example cloud-based/AI functionalities and platforms can include, inter alia: unified advisor portal, customer support portal, AI/bots, knowledge bases, collaboration tools, analytics, enterprise-grade, core banking integration, omni-channel, metadata-driven, branding/customizations, audit/compliance, etc.

As shown, CSS system 100 can include cloud-based systems. Cloud-based systems can include CSS server(s) 108. Cloud-based systems can include tenant cloud-based platform 112. A tenant can be an entity with customers. An external firewall 110 can be implemented between cloud-based systems and on-premises systems.

On-premises systems can include user-web browser 102. On-premises systems can include API 104. On-premises systems can include internal system 106 A, internal system 106 B and/or internal system 106 C. The customer-controlled systems can be in another cloud-computing platform (e.g. tenant cloud-based platform 112) and/or in on-premise servers/systems. An external firewall 110 separates the on-premises systems from the various cloud-based platforms.

In one example, user-web browser 102 can send a request to CSS server(s) 108. CSS server(s) 108 provides user-web browser 102 metadata as to how to render the screen of the user-side computer running user-web browser 102. This can include, inter alia: fields to display, labels for fields, text box, date columns, contact type (e.g. with drop down values), mandatory elements, etc. With this metadata, user-web browser 102 generates the user screen. Examples of provided in FIGS. 4, 7 and 10 infra. CSS server(s) 108 handles the control plane of the process (e.g. how to handle metadata).

The user may which to use the screen on the user-web browser 102 to implement a search (e.g. file search by name, etc.). When the search is implemented, user-web browser 102 sends request to an on-premise API gateway such as API 104. API 104 then proxies the request to any location to pull the appropriate data.

API 104 can implement the following processes. API 104 can authenticate the user (e.g. login information, single sign-on process with a banking server, etc.). API 104 translates the requests for the backend system (e.g. from an application-side version, etc.). API 104 determine the appropriate system to service the request and the order of the request. API 104 determine configuration data of the request to the backend systems. API 104 sends the search request to the backup systems. API 104 receives the data and formats the reply for rendering by user-web browser 102. User-web browser 102 receives the data from API 104 and renders is also based on metadata from CSS server(s) 108. In this way, various sensitive information (e.g. customer name, email address, social security number, etc.) is not sent to the CSS server(s) 108, but maintained in the on-premises systems. On a virtual identifier is sent to the CSS server(s) 108. The virtual identifier does not include said personal details of the customer. The metadata is stored in CSS server(s) 108.

Additionally, customer-controlled systems can be API 104 and internal system 106 A, internal system 106 B and/or internal system 106 C. Internal system 106 A, internal system 106 B and/or internal system 106 C can be the various backend systems that interface with API 104.

System 100 can track all actions of API 104. This information (e.g. actions performed by a customer service representative on behalf of the customer, etc.) can be stored for later use when re-interacting with a relevant customer. System 100 can enable others (e.g. other customer service representatives, etc.) to access this information at another time.

System 100 can set up the metadata as follows. System 100 can provide that internal system 106 A, internal system 106 B and/or internal system 106 C are specified endpoints and require specified types of authentication to access. The broken line box in system 100 indicates the infrastructure elements controlled by the tenant. This information can be used to search a specified field. Accordingly, it can be used to map metadata from CSS server(s) 108 to the specified services and set of permissions to access internal system 106 A, internal system 106 B and/or internal system 106 C.

Figure 2:
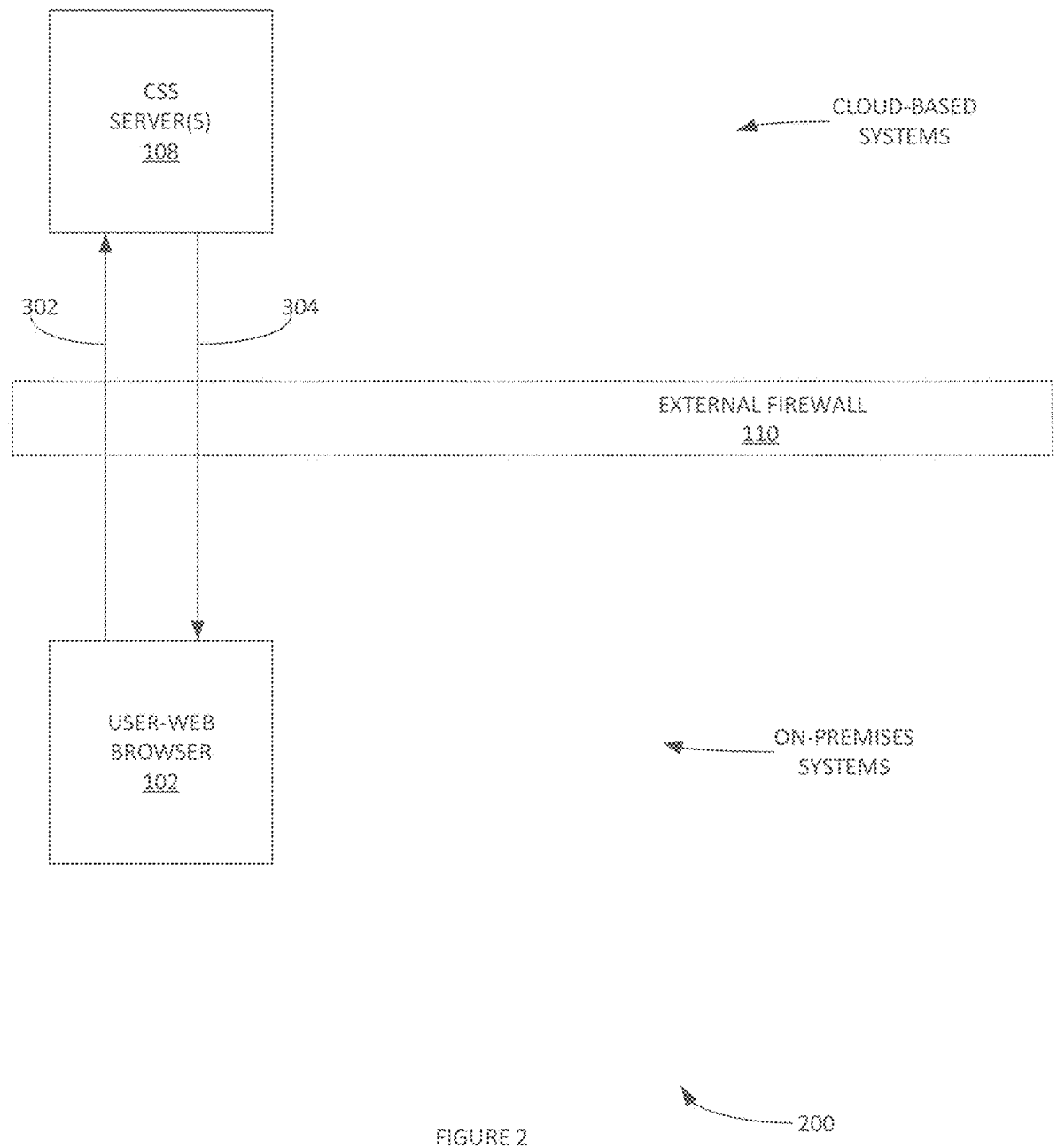
FIG. 2 illustrates an example portion of CSS system used to implement process 300, according to some embodiments.

FIG. 2 illustrates an example portion of CSS system 100 used to implement process 300 infra, according to some embodiments. FIG. 2 illustrates how process 300 can be implemented by the elements of CSS system 100.

It is noted that the processes and systems of FIGS. 2-10 can be combined into a single flow in some embodiments. In other embodiments, various permutations processes and systems of FIGS. 2-10 of the can be deployed. The processes and systems of FIGS. 2-10, as well as, FIG. 1 can be implemented using the computing system of FIG. 11 and/or various cloud-computing platforms. For example, processes 300, 600 and 900 can be included in a single flow. Processes 300, 600 and 900 can provide deep industry-specific functionality. Processes 300, 600 and 900 can be used to implement a CRM service that does not store customer data. Processes 300, 600 and 900 can connect to open core banking systems/internal systems.

Figure 3:
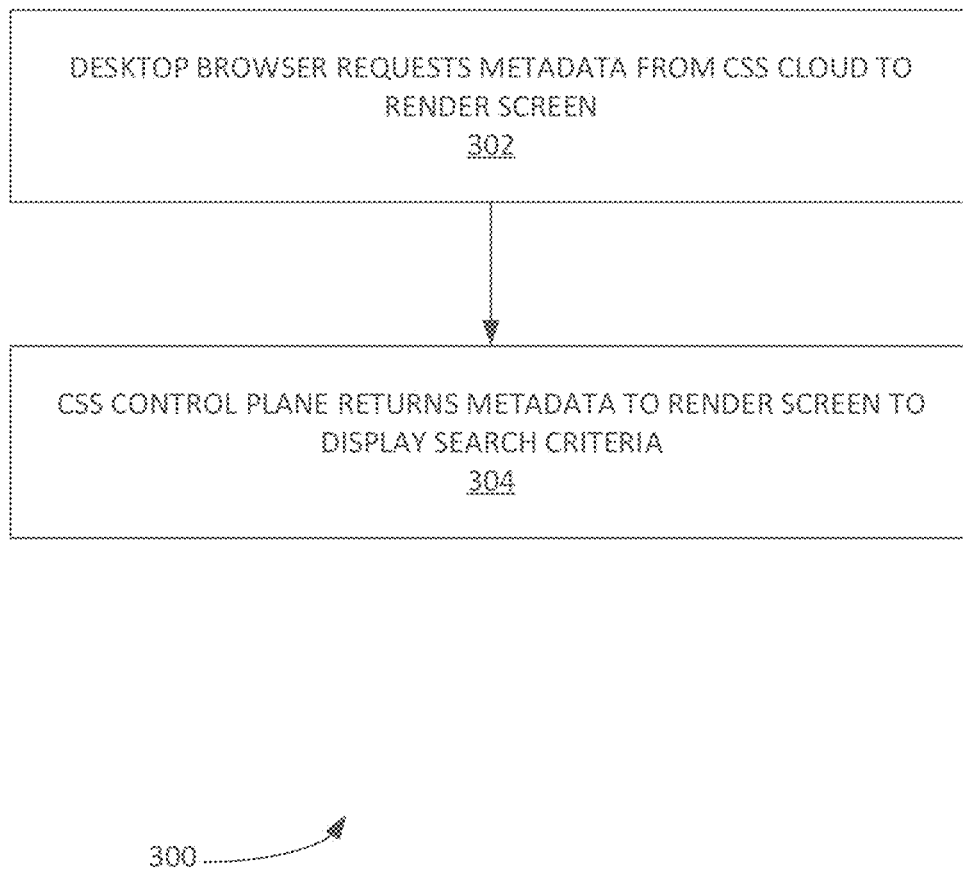
FIG. 3 illustrates an example process for obtaining metadata to render screen to display search criteria, according to some embodiments.
Figure 4:
FIG. 4 illustrates an example web browser displayed user interface element used by process 300, according to some embodiments.

FIG. 3 illustrates an example process for obtaining metadata to render screen to display search criteria, according to some embodiments. In step 302, a desktop browser (e.g. user web browser 102, etc.) requests metadata from CSS. In step 304, CSS control plane (e.g. using CSS server(s) 108, etc.) returns metadata to render screen to display search criteria. FIG. 4 illustrates an example web browser displayed user interface element used by process 300, according to some embodiments.

Figure 5:
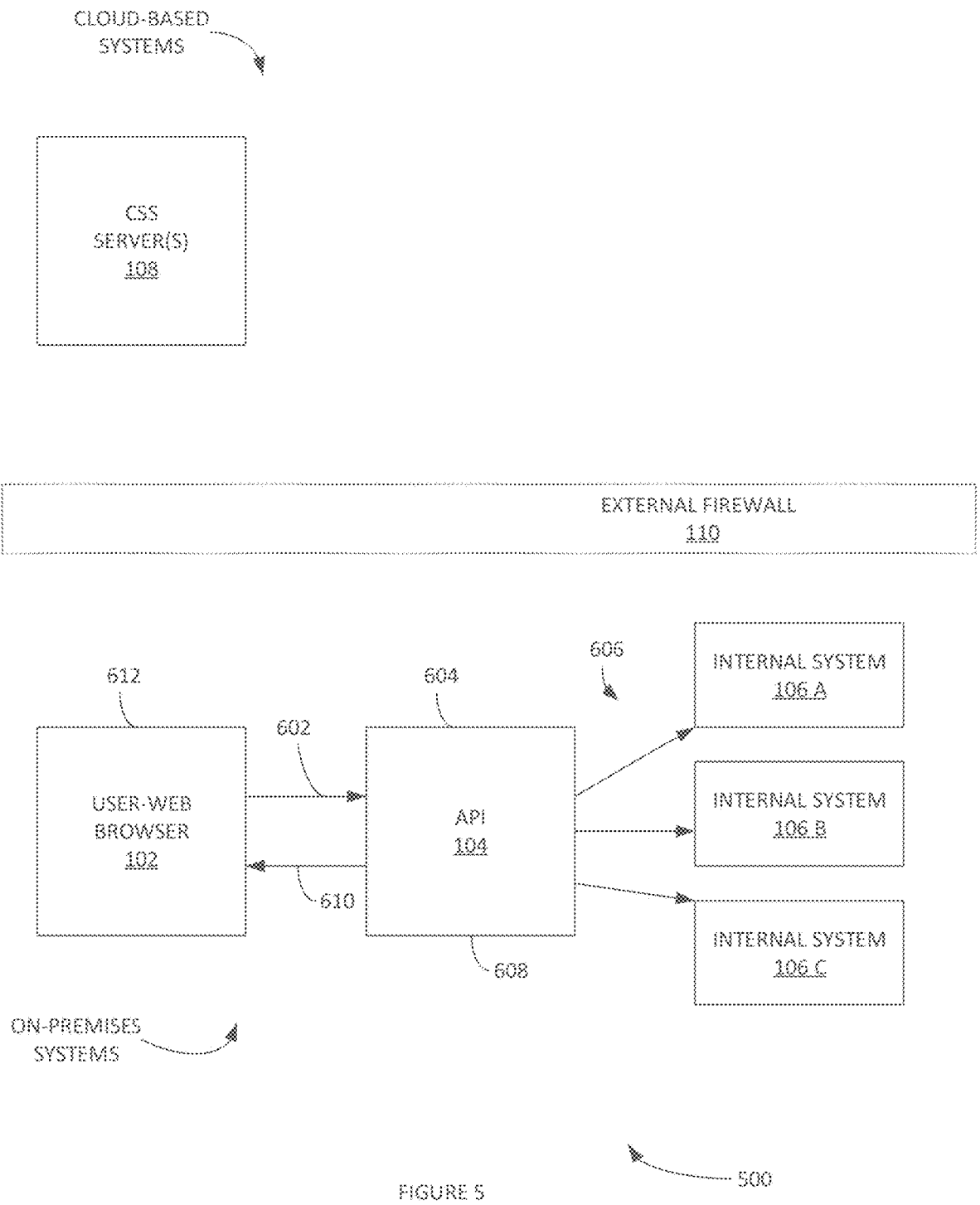
FIG. 5 illustrates an example portion of CSS system used to implement process 600, according to some embodiments.

FIG. 5 illustrates an example portion of CSS system 100 used to implement process 300 infra, according to some embodiments.

FIG. 5 illustrates how process 600 can be implemented by the elements of CSS system 100.

Figure 6:
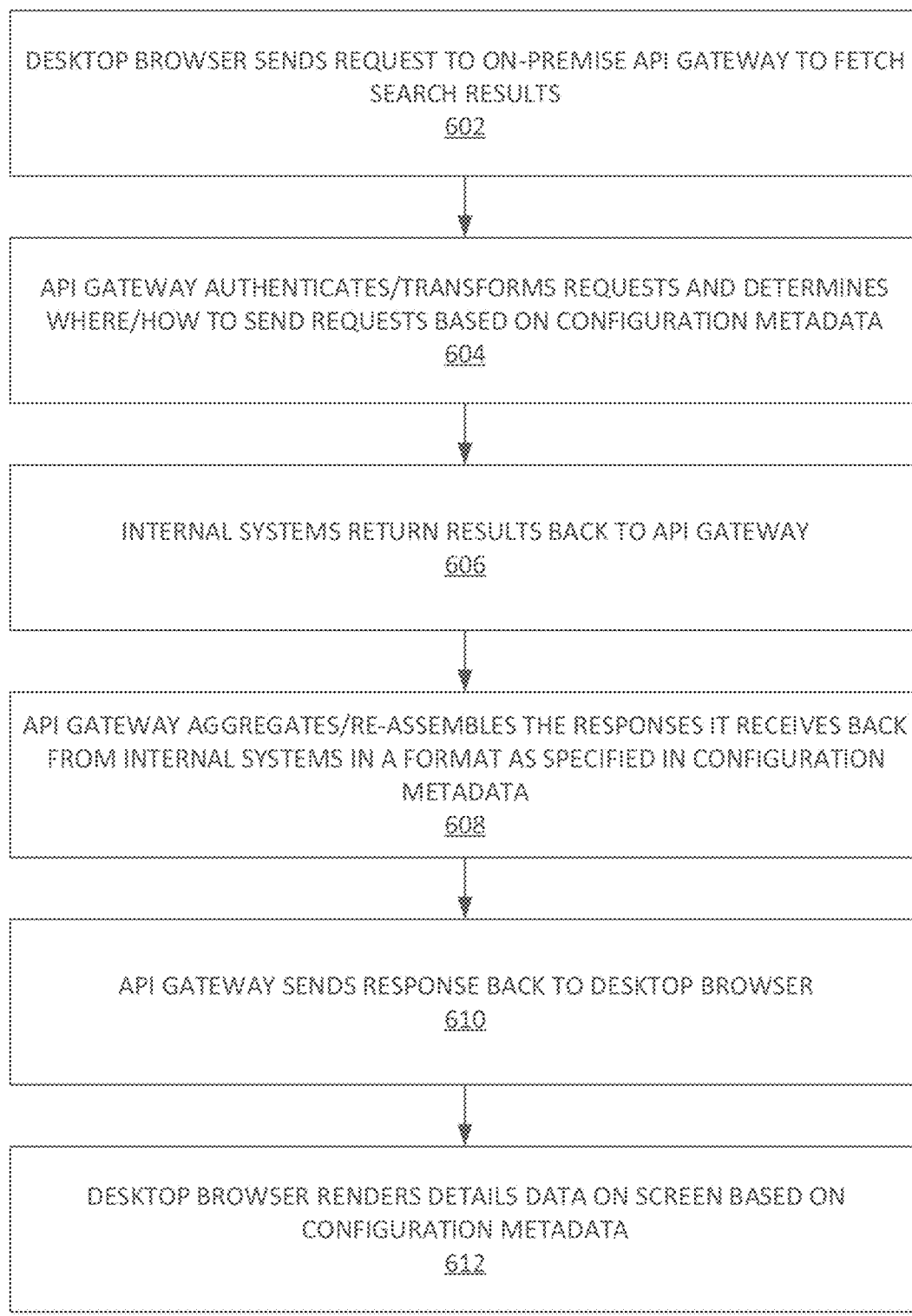
FIG. 6 illustrates an example process using configuration metadata to aggregates/re-assembles the responses, according to some embodiments.

FIG. 6 illustrates an example process 600 using configuration metadata to aggregates/re-assembles the responses, according to some embodiments. In step 602, a desktop browser sends request to on-premise API gateway to fetch search results. In step 604, the API gateway authenticates/transforms requests and determines where/how to send requests based on configuration metadata. In step 606, internal systems return results back to API gateway. In step 608, API gateway aggregates/re-assembles the responses it receives back from internal systems in a format as specified in configuration metadata. In step 610, API Gateway sends response back to desktop browser. In step 612, desktop browser renders details data on the screen based on configuration metadata.

Figure 7:
FIG. 7 illustrates an example web browser displayed user interface element used by process 600, according to some embodiments.

FIG. 7 illustrates an example web browser displayed user interface element used by process 600, according to some embodiments.

Figure 8:
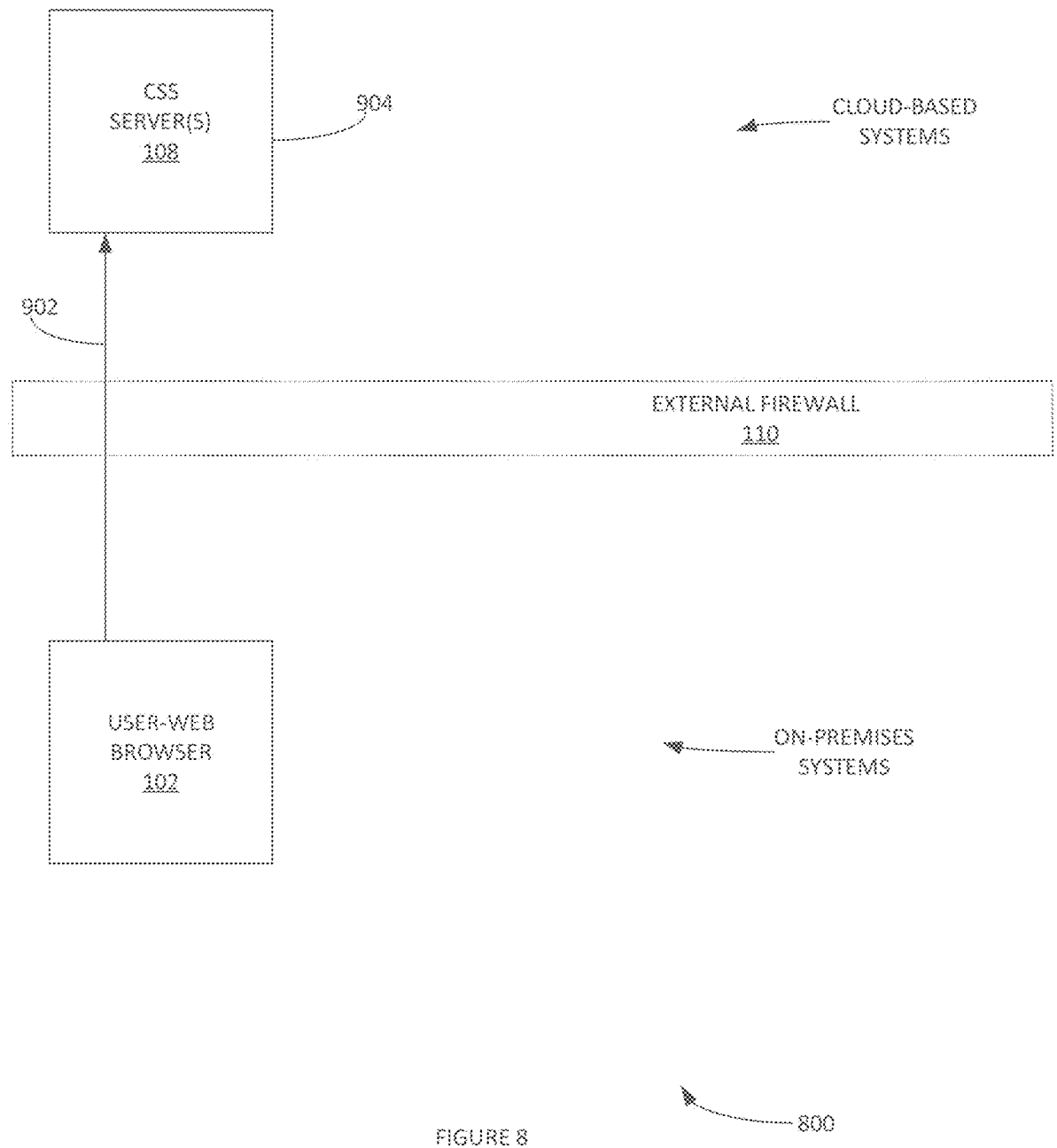
FIG. 8 illustrates an example portion of CSS system 100 used to implement process 900, according to some embodiments.

FIG. 8 illustrates an example portion of CSS system 100 used to implement process 900 infra, according to some embodiments. FIG. 8 illustrates how process 900 can be implemented by the elements of CSS system 100.

Figure 9:
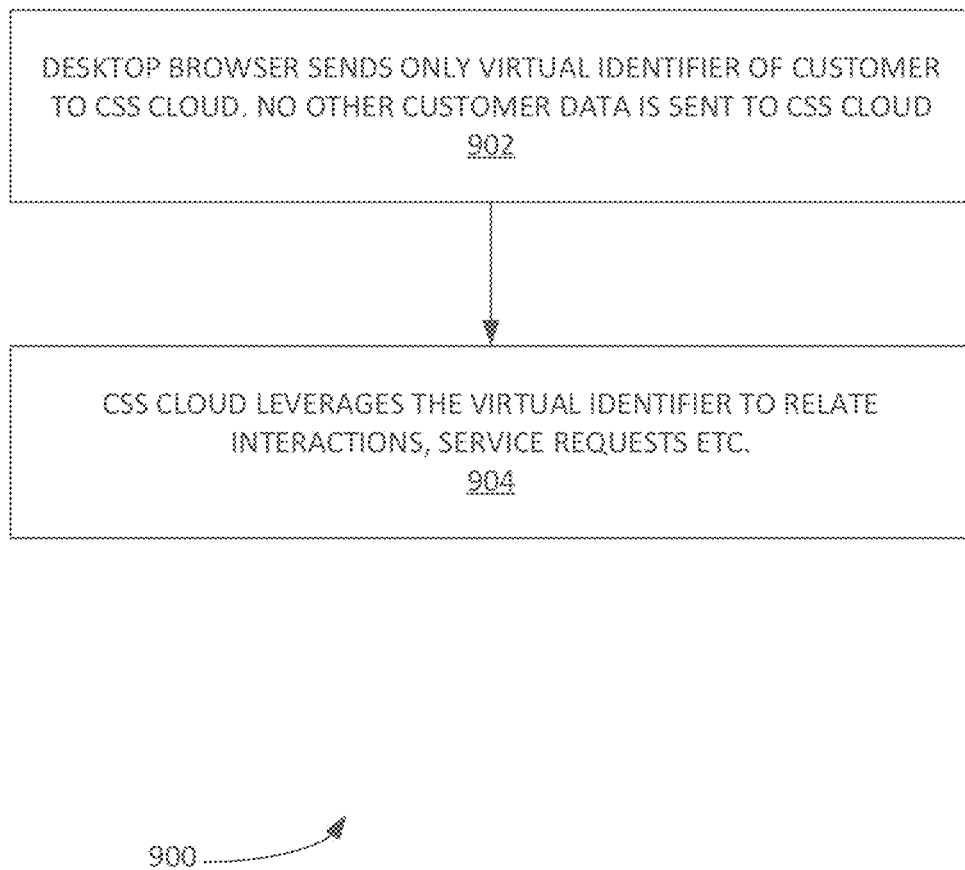
FIG. 9 illustrates an example process for leveraging a virtual identifier with a CSS cloud-based functionality, according to some embodiments.

FIG. 9 illustrates an example process 900 for leveraging a virtual identifier with a CSS cloud-based functionality, according to some embodiments.

Figure 10:
FIG. 10 illustrates an example web browser displayed user interface element used by process 900, according to some embodiments.

FIG. 10 illustrates an example web browser displayed user interface element used by process 900, according to some embodiments. In step 902, desktop browser sends only virtual identifier of customer to CSS cloud. Process 900 ensures that no other customer data is sent to CSS cloud. In step 904, CSS cloud leverages the virtual identifier to relate interactions, service requests etc.

Figure 11:
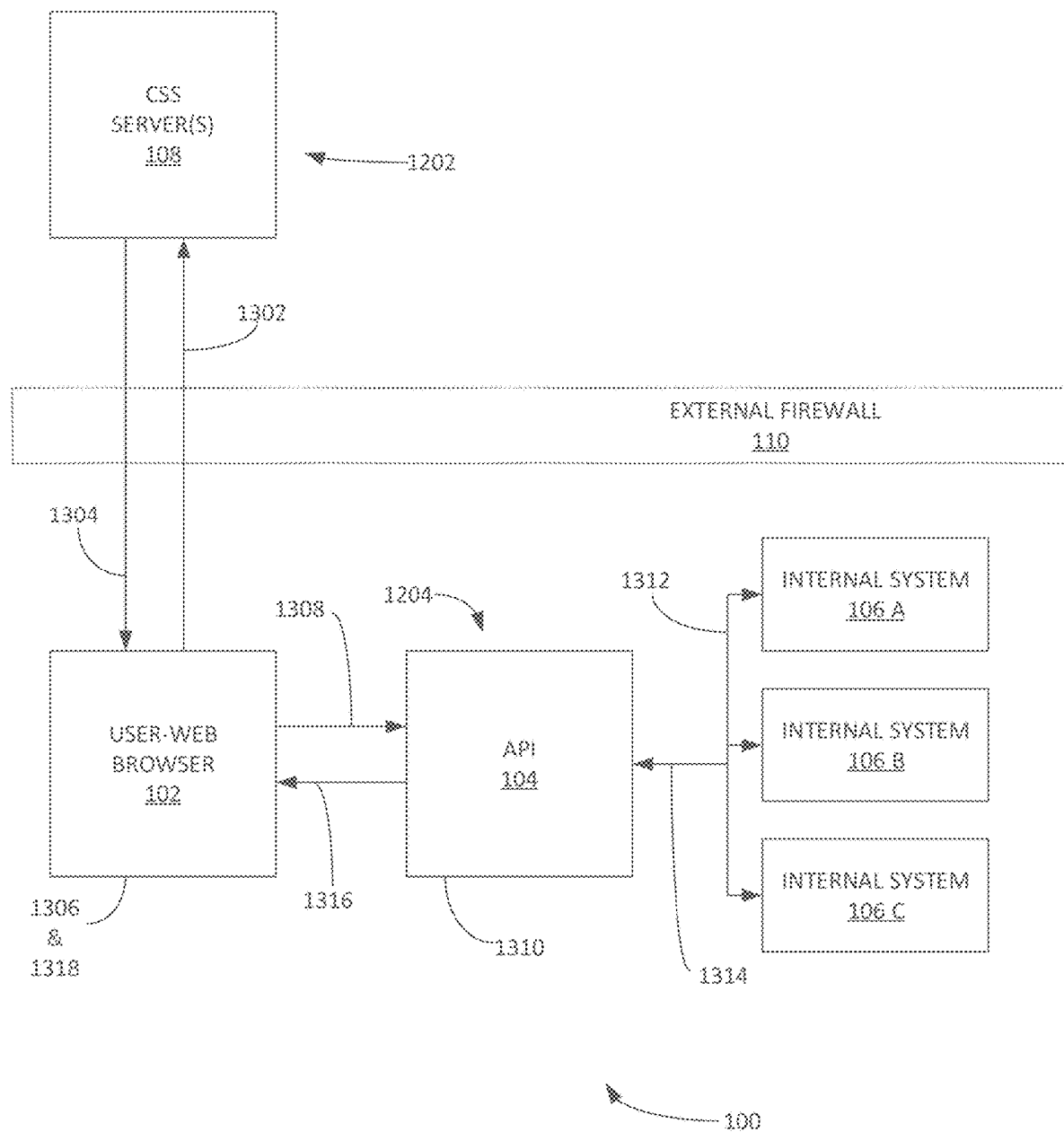
FIG. 11 illustrates an example portion of CSS system used to implement processes 1200 and 1300 infra, according to some embodiments.

FIG. 11 illustrates an example portion of CSS system 100 used to implement processes 1200 and 1300 infra, according to some embodiments.

Figure 12:
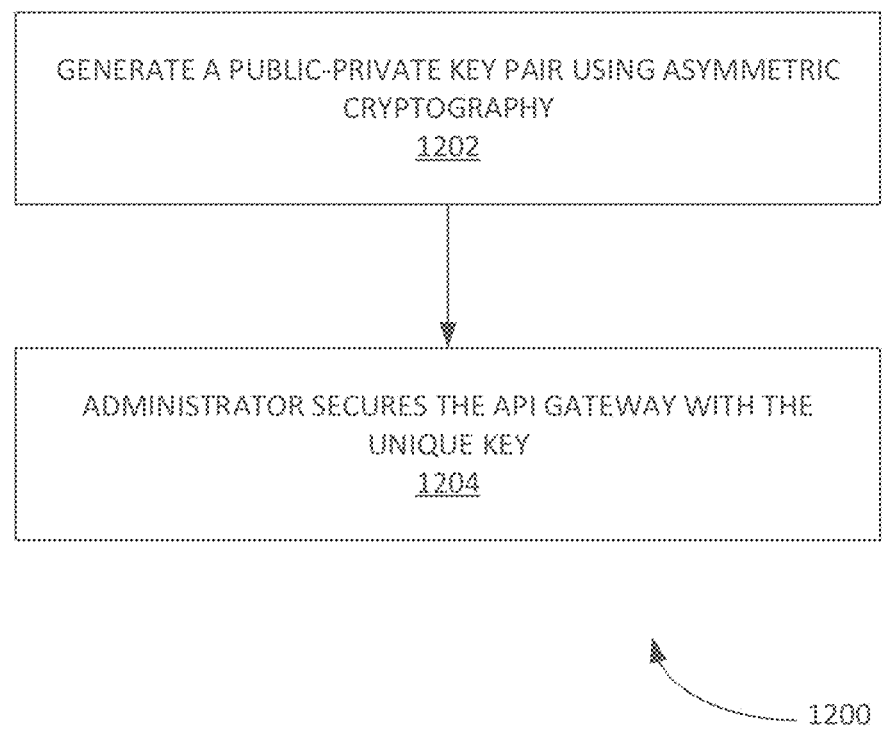
FIG. 12 illustrates an example process for an administrative setup for API gateway security, according to some embodiments.

FIG. 12 illustrates an example process 1200 for an administrative setup for API gateway security, according to some embodiments. In step 1202, process 1200 generates a public-private key pair using asymmetric cryptography. In step 1204, the administrator secures the API Gateway with the unique key.

Figure 13:
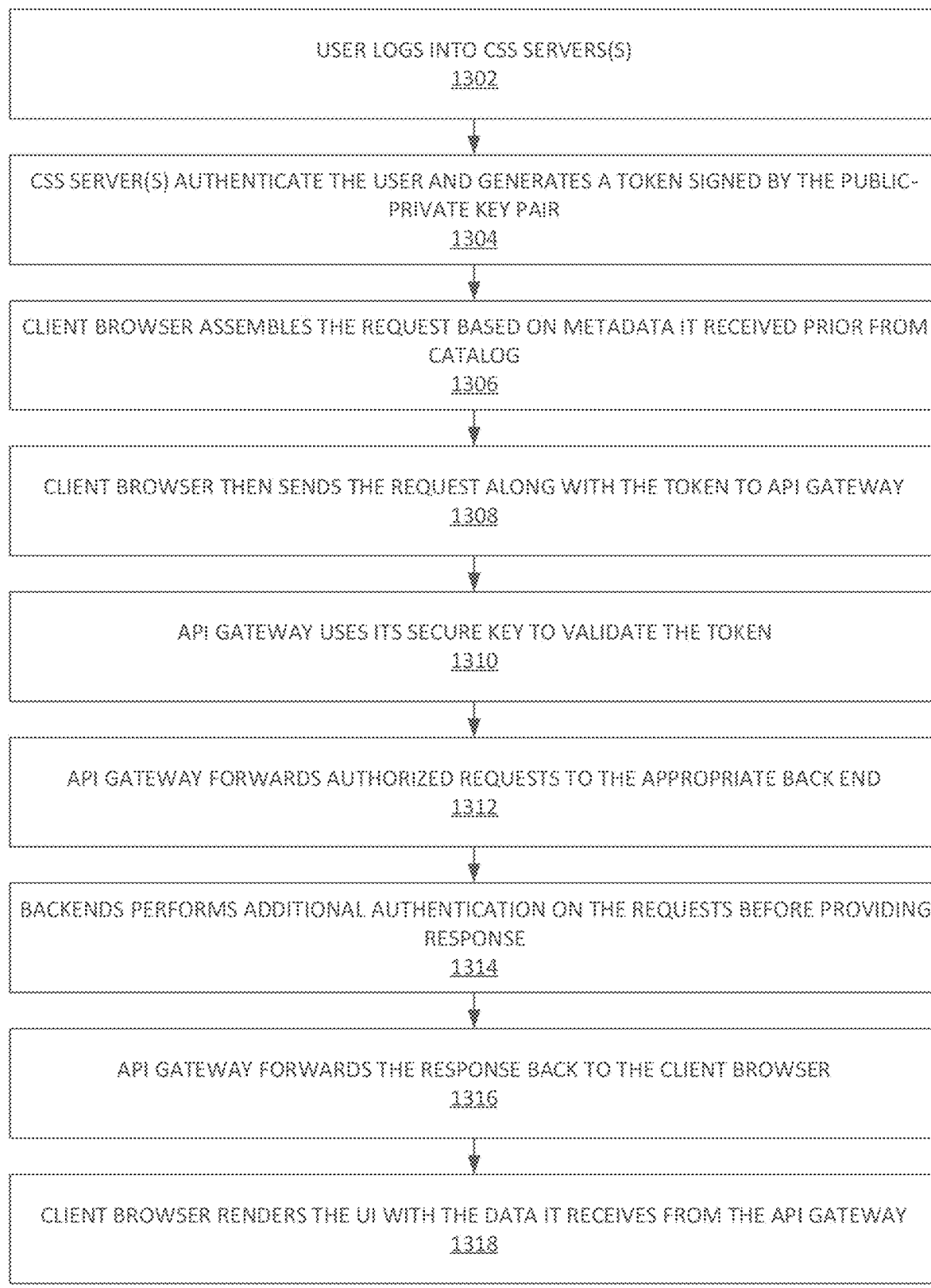
FIG. 13 illustrates an example process for implementing an API Gateway Security, according to some embodiments.

FIG. 13 illustrates an example process 1300 for implementing API Gateway Security, according to some embodiments. In step 1302, the user logs into CSS servers(s) 108 (e.g. via their corporate single-sign on system, CSS user credentials, etc.). In step 1304, CSS server(s) 108 authenticate the user and generates a token signed by the public-private key pair (e.g. see step 1202, etc.). In step 1306, a client browser (e.g. user web browser 102, etc.) assembles the request based on metadata it received prior from catalog. In step 1308, the client browser then sends the request along with the token (from step 1304) to API gateway 104. In step 1310, API gateway uses its secure key (e.g. from step 1202, etc.) to validate the token. In step 1312, API gateway forwards authorized requests to the appropriate back end (e.g. internal systems 106 A-C). In step 1314, backends (e.g. internal systems 108 A-C, etc.) can perform additional authentication on the requests before providing response. In step 1316, API gateway forwards the response back to the client browser. In step 1318, client browser renders the UI with the data it receives from the API gateway.

Figure 14:
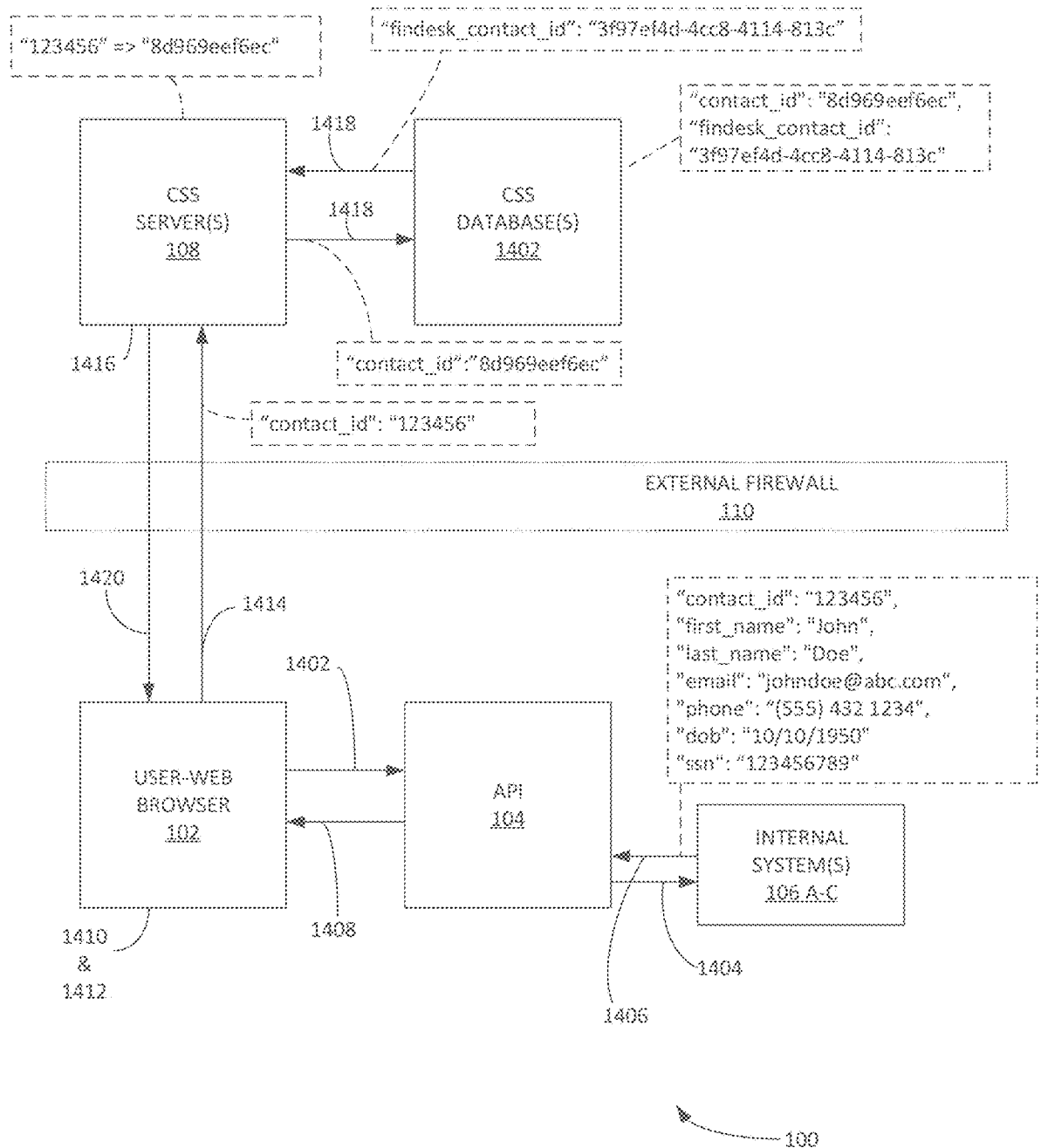
FIG. 14 illustrates an example portion of CSS system used to implement process 1500 infra, according to some embodiments.

FIG. 14 illustrates an example portion of CSS system 100 used to implement process 1500 infra, according to some embodiments.

Figure 15:
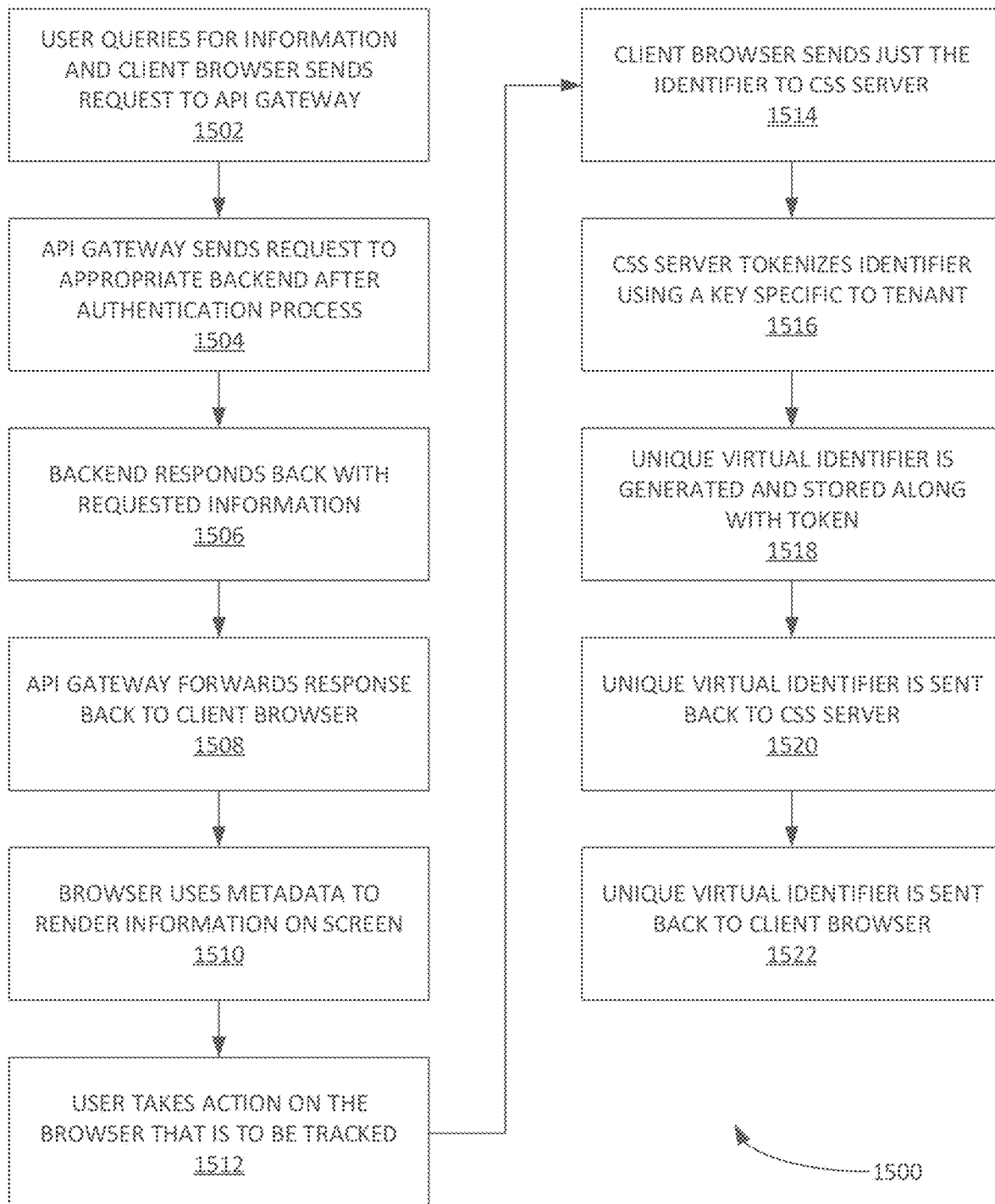
FIG. 15 illustrates an example process that can be used herein, according to some embodiments.

FIG. 15 illustrates an example process 1500 that can be used herein, according to some embodiments. In step 1502, a user queries for information and the client browser sends the request to API gateway. In step 1504, the API gateway sends a request to the appropriate backend after an authentication process. In step 1506, the backend responds back with the requested information. In step 1508, the API gateway forwards the response back to the client browser. In step 1510, the browser uses the metadata to render the information on the screen. In step 1512, the user takes action on the browser that is to be tracked. In step 1514, the client browser sends just the identifier (e.g. contact_id in the present example of FIG. 14) to the CSS server. In step 1516, the CSS server tokenizes the identifier using a key specific to the tenant. In step 1518, a unique virtual identifier (e.g. findesk_contact_id in the present example of FIG. 14) is generated and stored along with the token (e.g. tokenized contact_id) from step 1516. In step 1520, the unique virtual identifier is sent back to the CSS server. In step 1522, the unique virtual identifier is sent back to the client browser (e.g. as shown in FIG. 14).

Additional Example Computer Architecture and Systems

Figure 16:
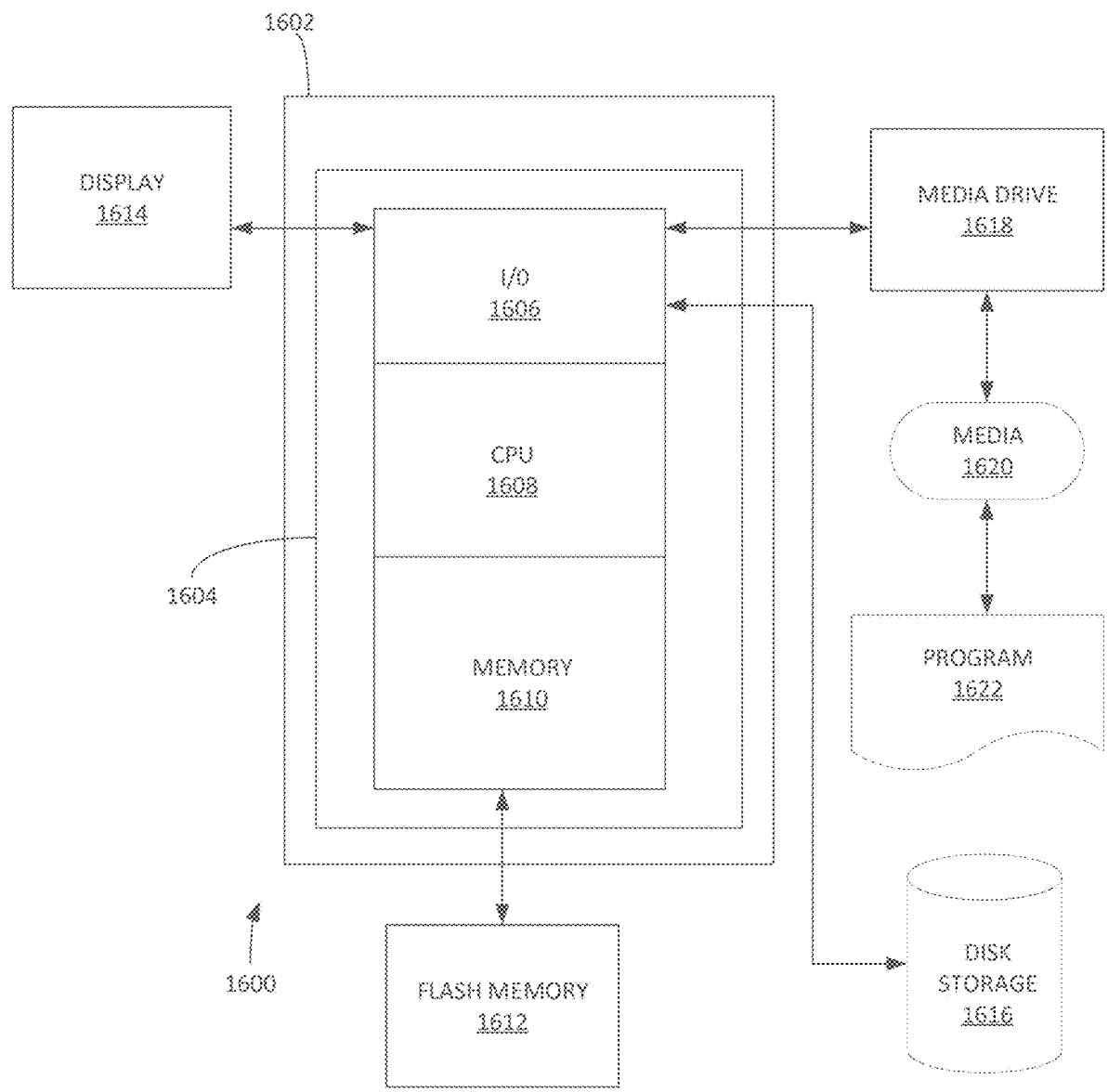
FIG. 16 is a block diagram of a sample computing environment that can be utilized to implement various embodiments.

FIG. 16 depicts an exemplary computing system 1600 that can be configured to perform any one of the processes provided herein. In this context, computing system 1600 may include, for example, a processor, memory, storage, and I/O devices (e.g., monitor, keyboard, disk drive, Internet connection, etc.). However, computing system 1600 may include circuitry or other specialized hardware for carrying out some or all aspects of the processes. In some operational settings, computing system 1600 may be configured as a system that includes one or more units, each of which is configured to carry out some aspects of the processes either in software, hardware, or some combination thereof.

FIG. 16 depicts computing system 1600 with a number of components that may be used to perform any of the processes described herein. The main system 1602 includes a motherboard 1604 having an I/O section 1606, one or more central processing units (CPU) 1608, and a memory section 1610, which may have a flash memory card 1612 related to it. The I/O section 1606 can be connected to a display 1614, a keyboard and/or other user input (not shown), a disk storage unit 1616, and a media drive unit 1618. The media drive unit 1618 can read/write a computer-readable medium 1620, which can contain programs 1622 and/or data. Computing system 1600 can include a web browser. Moreover, it is noted that computing system 1600 can be configured to include additional systems in order to fulfill various functionalities. Computing system 1600 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed by United States patent:

1. A computerized method for implementing a Customer Support System (CSS) system in a secure and private customer service automation platform comprising:
    determining that a user request for information;
    with a client browser:
    sending the request to API gateway;
    with an application programming interface (API) gateway:
        sending the request to an appropriate backend system after an authentication process;
    with a backend system:
    responding back with the requested information;
    with the API gateway:
    forwarding the response back to the client browser;
    with the client browser:
    using a metadata to render the information on the screen;
    wherein the user takes an action on the client browser that is to be tracked, sending just an identifier to a CSS server;
    with the CSS server:
    tokenizing the identifier using a key specific to a tenant;
    generating a unique virtual identifier;
    storing the unique virtual identifier along with the token;
        sending the unique virtual identifier to the API Gateway and
    wherein the unique virtual identifier is sent back to the client browser by the API gateway.

2. The computerized method of claim 1, wherein the identifier comprises a identifier contact_id.

3. The computerized method of claim 2, wherein the unique virtual identifier comprises a findesk_contact_id.

4. The computerized method of claim 3, wherein the token comprises a tokenized contact_id.

\* \* \* \* \*